3,847,837
CARBON DIOXIDE ABSORBENT GRANULES
Daniel A. Boryta, Downingtown, Pa., assignor to
Foote Mineral Company, Exton, Pa.
No Drawing. Filed Apr. 25, 1972, Ser. No. 247,458
Int. Cl. B01j 11/00, 11/22, 11/32
U.S. Cl. 252—468                                    2 Claims

ABSTRACT OF THE DISCLOSURE

Carbon dioxide absorbent granules having finely-divided, non-hygroscopic inorganic particles adhering to the surface thereof, are substantially dust-free and yet retain their ability to absorb carbon dioxide.

BACKGROUND OF THE INVENTION

Various inorganic compounds are utilized in solid, granular form as chemical absorbents for carbon dioxide in life-support systems. For example, metallic oxides, hydroxides and peroxides such as calcium hydroxide, barium hydroxide, lithium hydroxide, lithium peroxide, lithium oxide, potassium superoxide, and the like, are widely utilized to absorb acidic gases (carbon dioxide) from environments where their presence is inimical to life, such as gas anesthesia systems, manned space vehicles, subterranean mining environments, and the like.

The metallic oxides, hydroxides, and peroxides noted above are efficient carbon dioxide absorbents; however, in granular form these absorbents are friable, easily disintegrating with even slight mechanical agitation producing a "dust" which, due to its alkaline and caustic nature, is especially irritating to the nasal cavity, pharynx, skin, eyes and mucosa of any human or animal life existing in the environment in which the absorbent material is present. For this reason, elaborate and costly filtration systems are included in gaseous life-support systems to trap the dust generated simply by the flow of air through the system so that the noxious effects of the dust will not be visited on the inhabitants of the environmental system.

Many attempts have been made to eliminate dusting associated with the use of carbon dioxide absorbent granules by physically coating the granules with various materials. For example, U.S. Pat. No. 3,259,464 teaches that dusting of metallic hydroxide absorbent granules can be substantially reduced by admixing the absorbent granules with an alkali metal salt of carboxymethylcellulose. An August 1968 publication entitled "Dust Retardation Studies of Carbon Dioxide Sorbents" of MSA Research Corporation, discusses the use of solutions of surfactants, organic polymers, lithium chloride and lithium bromide salts to diminish the dusting tendency of carbon dioxide absorbent granules. A variety of other glue-like materials, plastics, rubbers and the like, have also been utilized in an effort to reduce dusting of the absorbent granules. Unfortunately, while the dust-preventative coatings utilized in the past have eliminated granular dusting to some degree, the coatings have also impaired the ability of the granules to absorb carbon dioxide. U.S. Pat. No. 3,497,345 teaches that coating pesticide granules with titanium dioxide reduces dusting normally associated with the use of such granules. The patent notes, however, that the titanium dioxide coating inhibits exchange of material due to sorption or desorption between the coated granules and the environment surrounding them.

It is the object of this invention to provide substantially dust-free carbon dioxide absorbent granules which retain their ability to absorb carbon dioxide for use in systems utilized to provide a life-supporting gaseous environment.

A further object of this invention is to provide substantially dust-free carbon dioxide absorbent granules which are free-flowing, resistant to physical disintegration, and economical to prepare.

DETAILED DESCRIPTION OF THE INVENTION

The present invention relates to solid, particulate carbon dioxide absorbent granules having finely-divided, non-hygroscopic inorganic particles adhering to the surface of said granules to render the granules substantially dust-free without substantially inhibiting the ability of the granules to absorb carbon dioxide.

Remarkably, carbon dioxide absorbent granules having finely-divided, non-hygroscopic inorganic particles adhering thereto are not only dust-free, but also, there is no inhibition in the ability of the granules to absorb carbon dioxide. This result is especially surprising in view of the present state of the art where it is expected that any reduction in granular dusting occasioned by coating of the absorbent granules will be accompanied with a concomitant reduction in the ability of the granules to absorb carbon dioxide.

A variety of well-known carbon dioxide absorbent materials may be utilized as the absorbent granules in this invention. For example, carbon dioxide absorbent granules can be prepared from metallic hydroxides such as barium hydroxide, calcium hydroxide, lithium hydroxide, sodium hydroxide, and the like; mixtures of two or more of metallic hydroxides such as a mixture of sodium hydroxide and calcium hydroxide or a mixture of calcium hydroxide and barium hydroxide and the like; various inorganic metallic peroxides such as lithium peroxide, sodium peroxide and the like; and metallic oxides such as lithium oxide, potassium superoxide, calcium oxide and the like.

Absorbent granules are prepared from these materials by well known procedures. For example, U.S. Pat. No. 3,321,277 describes a procedure in which an aqueous slurry of hydrogen peroxide and solid lithium hydroxide is permitted to react forming a precipitate of lithium peroxide which is separated from the slurry and, while still moist, formed into granules which are then dried under vacuum. The dried granular lithium peroxide granules are then converted to lithium oxide by thermal decomposition. Another procedure described in U.S. Pat. 3,259,464, involves mixing a metallic hydroxide or mixture of metallic hydroxides with water to form a plastic mass which is dried and ground into small and irregularly shaped granules.

By whatever manner they are produced, the granular absorbents are relatively porous and function in gaseous life support systems as chemical sorbents for carbon dioxide. Their anhydrous nature also permits the absorption of some moisture generated by inhabitants in a life support system.

In forming the substantially dust-free carbon dioxide absorbent granules of this invention, the granular absorbent particles are admixed with finely-divided, non-hygroscopic inorganic particles. The non-hygroscopic inorganic particles with which the absorbent granules are mixed have strong electrical attractions between particles thereof; thus, even though finely-divided, they do not fume or disperse in the form of a fine dust even when subjected to vigorous agitation. In fact, when the non-hygroscopic materials are agitated, strong static electrical charges are developed which do not dissipate on standing because of the non-hygroscopic nature of the particles. The static electrical attractions which exist between inorganic particles cause the particles to adhere not only to one another eliminating fuming, but also, to the surface of the absorbent granules with which they are mixed where they form a porous protective covering which substantially eliminates dusting of the absorbent granules and yet, due to its porous nature, does not affect the ability of the granules to absorb carbon dioxide and moisture. In addition, the nonhygroscopic nature of the porous covering on the absorbent granules aids in eliminating channeling and agglomeration of the absorbent granules.

No-hygroscopic inorganic materials which form the desired porous protective covering on absorbent granules include metal oxides such as titanium dioxide, zinc oxide, nickel(ic) oxide, stannic oxide, manganese sesquioxide ($Mn_2O_3$), cobaltic oxide, lead oxide, ferric oxide, tungstic acid ($H_2WO_4$) and chromic oxide. Of these metal oxides, titanium dioxide and zinc oxide, preferably pigment grade $TiO_2$ and ZnO, are especially preferred for admixture with the carbon dioxide absorbent granules.

Admixtures of the carbon dioxide absorbent granules and the finely-divided, non-hygroscopic inorganic particles is accomplished by simple mechanical mixing of the absorbent granules with inorganic particles. The absorbent granules are admixed with from about 1 to about 25%, preferably from about 5 to about 10%, by weight, based on the combined weight of the absorbent granules and the inorganic particles, of the nonhygroscopic inorganic particles. The carbon dioxide absorbent granules which are utilized should have an average size practical for use in carbon dioxide absorption systems, with granules having an average particle size of between about 4 mesh and about 16 mesh being widely utilized. The finely divided, inorganic particles admixed with the absorbent granules need not be reduced to any specific size so long as the particles are substantially smaller in size than the absorbent granules with which they are mixed. Generally speaking, however, the finely-divided particles are $25\mu$ or less in size when admixed with the carbon dioxide absorbent granules. For example, $TiO_2$ particles less than $1_\mu$ in size adhere to absorbent granules having a particle size of between 4 to 16 mesh. Mixture of the absorbent granules and the inorganic particles may be accomplished in any suitable mixing apparatus, mixing continuing until the inorgaic particles are distributed throughout the absorbet granules adhering to at least a major portion of the surface of the absorbent granules to provide substantial elimination of granular dusting and yet not affect the ability of the granules to absorb carbon dioxide.

The substantially dust-free carbon dioxide absorbent granules of this invention may be utilized in a variety of systems to provide a life supporting gaseous environment. For example, the granules can be utilized in gas anesthesiac systems. In such a system, the absorbent granules absorb carbon dioxide entering the system from the air expired by a patient to whom an anesthetic has been administered. Similarly, a supply of the absorbent granules may be placed in the air circulation system in manned space vehicles to remove carbon dioxide from the circulatory gaseous environment in the space craft. In addition to the chemical sorption of carbon dioxide, the granules also absorb some moisture injected into the life support environment in the form of water vapor in the course of normal respiration of any inhabitants in the environmet. This function also aids in the maintenance of a life supporting gaseous environment.

Carbon dioxide absorbent granules prepared in accordance with this invention have been evaluated to determine both the dusting characteristics of the granules and the ability of the granules to absorb carbon dioxide.

The ability of the absorbent granules prepared in accordance with this invention to absorb carbon dioxide has been evaluated in the following manner. The absorbent granules are loaded into a glass tube 12 cm. in length and 1.49 cm. in diameter having a gas inlet and a gas outlet at the opposing ends thereof. A gas test meter which measures and controls the volume of carbon dioxide passing into the tube is attached to the gas inlet of the tube. A bubbler containing a saturated solution of barium hydroxide is attached to the gas outlet of the tube. With the aid of the gas test meter, air containing carbon dioxide maintained at a partial pressure of carbon dioxide of 15.2 mm. of mercury and a partial pressure of water vapor of 11 mm. of mercury is passed through the tube at a rate of 0.4 litres per minute at 1 atmosphere pressure and room temperature. Air passage continues until the effluent from the gas outlet of the tube demonstrates that carbon dioxide breakthrough has occurred. Carbon dioxide breakthrough (a point indicating that the absorbent granules have ceased to absorb 100% of the carbon dioxide entering the tube) is detected by the appearance of an insoluble white precipitate of barium carbonate which forms in the bubbler containing the barium hydroxide solution when the first traces of carbon dioxide appear in the effluent gas. As soon as breakthrough is detected, the flow of air into the gas inlet is ceased and gas test meter is read to determine the amount of air and carbon dioxide passed through the sample. The amount of carbon dioxide absorbed by the absorbent granules in the tube is determined by analyzing the carbon dioxide content of the absorbent granules through standard techniques such as titration with a pH meter to an end point of 4.

From the data produced by the procedure outlined above, the carbon dioxide index of the absorbent granules may be calculated. The carbon dioxide index provides a relative value representing the ability of the absorbent granules to absorb carbon dioxide. This relative value, of course, can be used to compare the carbon dioxide absorptive ability of any number of granular carbon dioxide absorbents. Assuming, for example, that untreated carbon dioxide granules such as lithium hydroxide granules prepared according to Military Specification for Lithium Hydroxide, MIL–L–20213D (SHIPS) have a carbon dioxide index of 1, it can generally be stated that carbon dioxide absorbent granules prepared in accordance with this invention have relative carbon dioxide index values which do not vary by more than 20 to 25%, and usually less than 7% from the index value of untreated material. For example, lithium hydroxide absorbent granules admixed with varying amounts of titanium dioxide (pigment grade) in accordance with this invention have a carbon dioxide index value ranging from about 0.8 to about 1.2, which compares favorably with the carbon dioxide index of 1 exhibited by untreated lithium hydroxide.

The carbon dioxide index may be calculated using the equation:

$$\frac{\left(\frac{g.\ CO_2\ \text{absorbed by test sample}}{g.\ \text{sample}}\right)}{\left(\frac{g.\ CO_2\ \text{absorbed by standard sample}}{g.\ \text{sample}}\right)} = \text{Carbon Dioxide Index}$$

The standard sample against which the absorbent granules are compared for purposes of this calculation is Navy grade anhydrous lithium hydroxide granules (4 x 8 mesh) made in accordance to the Military Specifications for Lithium Hydroxide, MIL–L–20213D (SHIPS).

A further procedure has been utilized to evaluate the dusting characteristics of the absorbent granules of this invention. In this procedure, denominated a dust generation test, airborne dust formation from carbon dioxide absorbent granules is measured by shaking a 20 gram sample of the carbon dioxide absorbent granules in a glass washing bottle (Ace Glass Co. No. 7166) while passing dry air through the sample at a rate of 9 liters per minute for ten minutes. The sample is agitated by placing the washing bottle containing the absorbent granules in a mechanical shaker and displacing the bottle 7 cm., 260 times a minute. The dust generated by the agitation is carried by the air passing through the sample and collected in a fiberglass filter above the sample. After agitation, the filter is removed from the wash bottle and washed with water. The wash water is then titrated with standard acid to a pH of 4. This endpoint includes both the hydroxide and carbonate components of the granules collected in the filter. The dust index is determined by calculation using the following equation:

$$\frac{\left(\frac{\text{g. of acid titrated to neutralized OH} + CO_2 \text{ of test sample}}{\text{g. sample}}\right)}{\left(\frac{\text{g. of acid titrated to neutralized OH} + CO_2 \text{ of standard sample}}{\text{g. sample}}\right)} = \text{Dust Index}$$

bottle and if this can be accomplished without sneezing, the sample is judged to be non-irritating.

A series of carbon dioxide absorbent granules prepared by mixing finely divided titanium dioxide powder (pigment grade) with various carbon dioxide absorbent granules for a minimum of 10 minutes in a rotating drum or blender were evaluated utilizing the procedure for determining the carbon dioxide index, the dust generation test and the nasal irritation test outlined above. Table I tabulates the results of these evaluations on a series of examples, the composition of which are described therein.

TABLE I

| Example No. | Granular absorbent | Granule size mesh (Tyler Series) | TiO$_2$ percent[a] | CO$_2$ index[b] | Dust index[c] | Irritation[d] |
|---|---|---|---|---|---|---|
| (1) | Anhydrous LiOH, MIL-L-20213D (ships)[e] | 4 x 14 | 0 | 1.00 | 1.00 | — |
| (2) | do | 4 x 14 | 7 | 1.06 | .30 | + |
| (3) | Anhydrous LiOH (Lithasorb®, Foote Mineral Company) | 16 x 30 | 0 | 1.25 | 2.21 | — |
| (4) | do | 16 x 30 | 10 | 1.22 | 0.10 | + |
| (5) | Anhydrous, low density LiOH[f] | 4 x 14 | 0 | 1.11 | 0.80 | — |
| (6) | do.[f] | 4 x 14 | 5 | 1.01 | 0.53 | + |
| (7) | do.[f] | 4 x 14 | 7 | 0.82 | 0.32 | + |
| (8) | do.[f] | 8 x 14 | 0 | 1.16 | 0.99 | — |
| (9) | do.[f] | 8 x 14 | 7 | 1.15 | 0.46 | + |
| (10) | do.[f] | 8 x 14 | 10 | 1.05 | 0.32 | + |
| (11) | Lithium peroxide | 4 x 14 | 0 | | 0.46 | — |
| (12) | do | 4 x 14 | 5 | | 0.09 | + |
| (13) | do | 4 x 14 | 7 | | 0.09 | + |
| (14) | Potassium superoxide (KO$_2$) | 4 x 14 | 0 | 0.14 | 5.18 | — |
| (15) | do | 4 x 14 | 5 | 0.10 | 0.28 | + |
| (16) | do | 4 x 14 | 7 | | 0.17 | + |
| (17) | 20% NaOH, 80% CaOH Sodasorb®, W. R. Grace Co.)[g] | 8 x 14 | 0 | 0.49 | 1.03 | — |
| (18) | do.[g] | 8 x 14 | 3 | 0.51 | 0.30 | + |
| (19) | do.[g] | 8 x 14 | 7 | 0.45 | 0.11 | + |
| (20) | 20% BaOH·8H$_2$O, 80% CaOH (Baralyme®, Edison Co.) | 4 x 8 | 0 | 0.13 | 2.58 | — |
| (21) | 20% BaOH·8H$_2$O, 80% CaOH (Baralyme®) | 4 x 8 | 3 | 0.15 | 0.26 | + |
| (22) | do | 4 x 8 | 7 | 0.13 | 0.15 | + |

[a] Percent, by weight, based on combined weight of absorbed granules and TiO$_2$.
[b] An index of 1 is equivalent to absorption of 0.52 g. of CO$_2$ per g. of sample (100% absorption efficiency).
[c] A Dust Index of 1 is equivalent to 0.1 mg. of lithium hydroxide per g. of sample.
[d] Empirical evaluation; —=irritation (sneezing); +=non-irritating (no sneezing).
[e] Pore volume=46.8% voids; specific surface area of 3 square meters/gram (m.$^2$/g.).
[f] Pore volume=49.7% voids; specific surface area of 6 square meters/gram (m.$^2$/g.).
[g] Coated with 0.5 to 3%, by weight, carboxymethylcellulose derivative Certain carbon dioxide absorbent granules inherently tend to generate more dust than others, the level of dusting produced depending in part on their physical properties and the manner in which they are prepared. Of course, the dust index calculated for a series of carbon dioxide absorbent granules prepared in accordance with this invention will reflect this inherent difference. Generally speaking, however, carbon dioxide absorbent granules prepared in accordance with this invention will have a dust index of from about 0.09 to about 0.50. Table I lists the dust index for a number of carbon dioxide absorbent granules, and, in each instance, the dust index of absorbent granules treated in accordance with this invention is substantially lower than the dust index of the untreated granules.

One rather empirical, yet useful, evaluation of the substantially dust-free nature of the carbon dioxide absorbent granules of this invention is a determination of the nasal irritation produced on inspiration of dust generated by vigorous agitation of the absorbent granules. The nasal irritation evaluation is completed by shaking a 100 gram sample of absorbent granules in a closed bottle. After shaking, the bottle is placed at rest and opened after five seconds. The evaluater then sniffs the open end of the As seen in Table I, carbon dioxide absorbent granules having finely-divided, non-hygroscopic titanium dioxide powder adhering to the surface thereof are substantially dust-free, non-irritating and yet retain their ability to absorb carbon dioxide.

Carbon dioxide absorbent granules admixed with a variety of finely-divided, non-hygroscopic inorganic particles and found to be non-irritating have been evaluated to determine their ability to absorb carbon dioxide in the following manner. In each instance, as illustrated in the Examples in Table II, the absorbent granules are prepared by admixing lithium hydroxide granules (Lithium Hydroxide, MIL-L-20213D (SHIPS)) with 7%, by weight, based on the combined weight of the absorbent granules and the inorganic particles, of the non-hygroscopic inorganic particles. A 1 gram sample of the absorbent granules is placed in a shallow sample holder and placed in a desiccator. Carbon dioxide maintained at a partial pressure of water vapor of 11 mm. of mercury is supplied to the desiccator over a 16 hour period. The samples are then analyzed to determine the amount of carbon dioxide absorbed by the granules. This is accomplished by measuring the volume of carbon dioxide evolved when the sample is dissolved in an acid solution while confined in an air tight container. The results of these analyses are set forth in Table II.

the carbon dioxide absorbent granules and adhering particles, of said metal oxide particles.

TABLE II

| Example No. | Granular absorbent | Non-hygroscopic inorganic material | Amount of inorganic material,[a] percent | G. carbon dioxide absorbed per g. of sample | Irritation [b] |
|---|---|---|---|---|---|
| (23) | Anhydrous lithium hydroxide [c] | None | | 0.746 | — |
| (24) | do | Titanium dioxide | 7 | 0.646 | + |
| (25) | do | Zinc oxide | 7 | 0.684 | + |
| (26) | do | Nickel oxide ($Ni_2O_3$) | 7 | 0.688 | + |
| (27) | do | Stannic oxide ($Sn_2O_4$) | 7 | 0.688 | + |
| (28) | do | Manganese sesquioxide ($Mn_2O_3$) | 7 | 0.709 | + |
| (29) | do | Cobaltic oxide ($Co_3O_4$) | 7 | 0.695 | + |
| (30) | do | Lead oxide | 7 | 0.671 | + |
| (31) | do | Ferric oxide ($Fe_2O_3$) | 7 | 0.684 | + |
| (32) | do | Chromic oxide ($Cr_2O_3$) | 7 | 0.665 | + |
| (33) | do | Tungstic acid ($H_2WO_4$) | 7 | 0.628 | + |

[a] Percent by weight, based on combined weight of absorbent granules and inorganic material.
[b] Empirical evaluation; —=irritation (sneezing); +=non-irritating (no sneezing).
[c] MIL-L-20213D (SHIPS).

As seen in Table II, there is an apparent reduction in carbon dioxide absorbed by the absorbent granules in Examples 24 to 33 when compared to the carbon dioxide absorbed by untreated lithium hydroxide granules in Example 23. This reduction, which averages about 6%, is more apparent than real, since the samples evaluated in Examples 24 to 33 include a total of 7%, by weight, of the non-hygroscopic inorganic material, material which does not absorb carbon dioxide.

Having thus described the invention, what is claimed is:

1. Solid, particulate carbon dioxide absorbent granules selected from the group consisting of lithium hydroxide, barium hydroxide, calcium hydroxide, sodium hydroxide, lithium peroxide, sodium peroxide, lithium oxide, potassium superoxide and calcium oxide having finely-divided, non-hygroscopic metal oxide particles selected from the group consisting of titanium dioxide, zinc oxide, nickel oxide, stannic oxide, manganese sesquioxide, cobaltic oxide, lead oxide, ferric oxide, tungstic acid and chromic oxide adhering to the surface of said granules to render them substantially dust-free without substantially inhibiting the ability of the granules to absorb carbon dioxide, prepared by admixture of said absorbent granules with said non-hygroscopic metal oxide particles, said granules having adhering to the surface thereof from about 1 to about 25%, by weight, based on the combined weight of the carbon dioxide absorbent granules and adhering particles, of said metal oxide particles.

2. The carbon dioxide absorbent granules of Claim 1 wherein from about 5 to about 10%, by weight, based on the combined weight of the carbon dioxide absorbent granules and adhering particles, of the inorganic particles adhere to the surface of the carbon dioxide granules.

References Cited
UNITED STATES PATENTS

| | | | |
|---|---|---|---|
| 2,209,354 | 7/1940 | Schmidt | 252—192 |
| 3,338,972 | 8/1967 | Young | 252—475 |
| 3,557,011 | 1/1971 | Colombo et al. | 423—230 |
| 2,780,513 | 2/1957 | Marzluff | 252—410 |
| 3,410,191 | 11/1968 | Jackson | 423—230 |
| 2,389,309 | 11/1945 | Herzmark | 423—230 |
| 3,489,693 | 1/1970 | Bovard | 252—476 |
| 3,619,130 | 11/1971 | Ventriglio | 252—476 |
| 3,607,040 | 9/1971 | Hervert | 252—476 |

DANIEL E. WYMAN, Primary Examiner

P. E. KONOPKA, Assistant Examiner

U.S. Cl. X.R.

252—184, 190, 192, 385, 473, 474, 475, 476; 423—230, 231